United States Patent [19]

Emmett, Jr. et al.

[11] 3,969,247
[45] July 13, 1976

[54] VACUUM FILTRATION PROCESS

[75] Inventors: Robert C. Emmett, Jr., Salt Lake City; Benjamin K. Pocock, Tooele, both of Utah

[73] Assignee: Envirotech Corporation, Menlo Park, Calif.

[22] Filed: June 20, 1975

[21] Appl. No.: 588,923

[52] U.S. Cl. .................................. 210/68; 210/77
[51] Int. Cl.² ........................................ B01D 33/06
[58] Field of Search .............. 210/68, 77, 179, 386, 210/402, 404, 406

[56] References Cited
UNITED STATES PATENTS

| | | | |
|---|---|---|---|
| 2,753,766 | 7/1956 | Simpson | 210/386 X |
| 2,997,176 | 8/1961 | Delmas | 210/77 X |
| 3,100,192 | 8/1963 | Rich | 210/386 |
| 3,338,411 | 8/1967 | Von Der Gathen et al. | 210/68 X |
| 3,592,341 | 7/1971 | Emmett, Jr. et al. | 210/68 |

FOREIGN PATENTS OR APPLICATIONS 1,143,790  2/1963  Germany ........................ 210/68

*Primary Examiner*—Charles N. Hart
*Assistant Examiner*—Robert H. Spitzer
*Attorney, Agent, or Firm*—Robert E. Krebs; Thomas S. MacDonald

[57] ABSTRACT

An improved process for dewatering sodium bicarbonate solids and similar substances formed as a cake on a rotary drum vacuum filter that is disposed for rotation in partial submergence in a slurry containing the suspended solids. The process includes the steps of pressing the filter cake against the surface of the filter drum by means of a pressure-applying roll which is driven to rotate so that its surface velocity exceeds the velocity of the drum surface by 25 to 75% and, thereafter, drawing steam through the filter cake while it is still on the surface of the filter drum.

3 Claims, 1 Drawing Figure

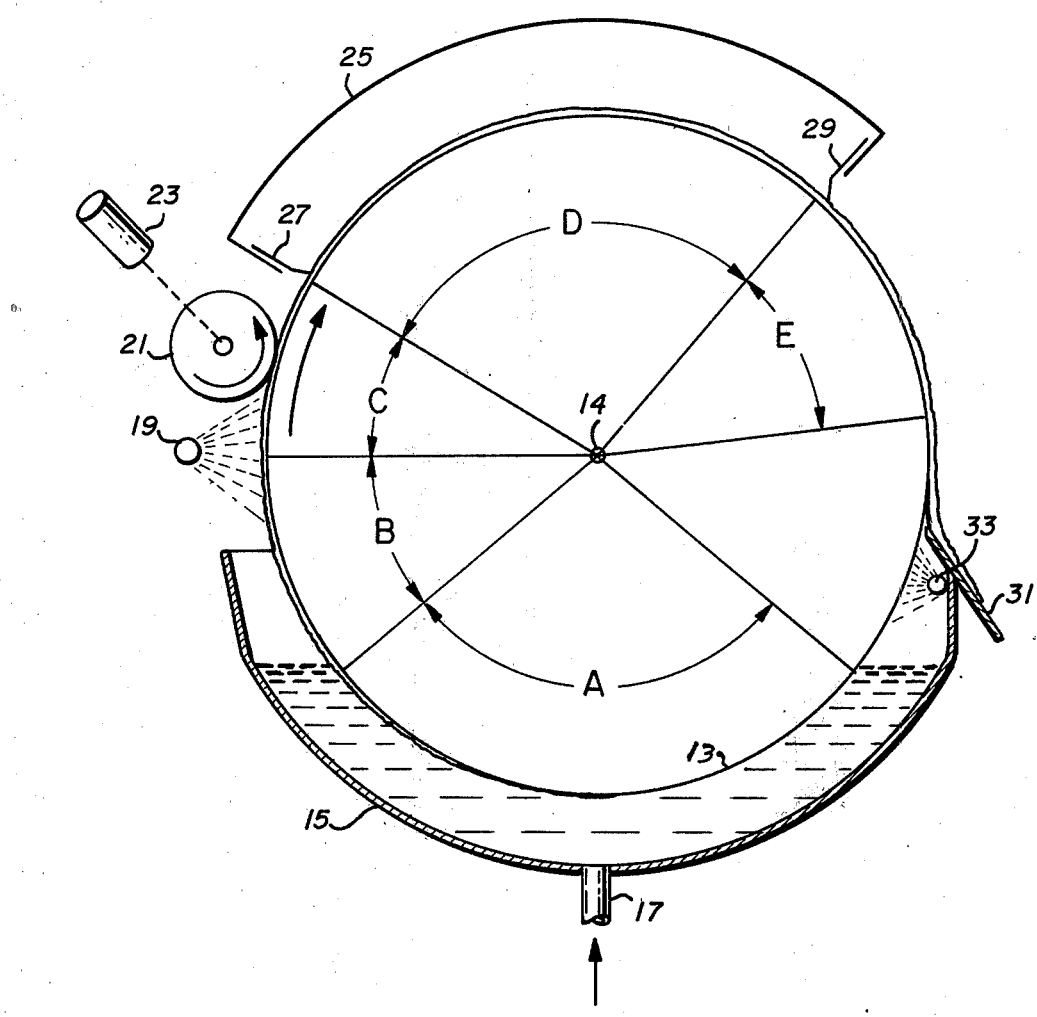

VACUUM FILTRATION PROCESS

This invention relates generally to an improved process for filtration by pressure-differential techniques and, more particularly, to such a filtration process for dewatering compressible materials such as sodium-bicarbonate solids.

It is known to precipitate sodium bicarbonate from lake brine by introducing carbon dioxide into the brine at about 130°F and under low pressures. To remove the sodium bicarbonate solids from suspension in the aqueous phase, it is known to cool the carbonated mixture to about 70°–75°F and then to operate upon the mixture with a conventional rotary drum vacuum filter in order to produce a moist or "dewatered" mat of solids called a "filter cake". More particularly, it is known to utilize a standard drum filter to form the filter cake and to equip the filter so that, while the cake is still on the drum surface, the cake is steamed and then compressed by a heavily loaded compression roll whose surface velocity equals the velocity of the drum surface. Such a process is not completely satisfactory, however, since the processed filter cake has a tendency to crack, to be overly moist, and to be difficult to remove from the filter drum.

The primary object of the present invention is to provide an improved method of filtering certain materials from suspension in an aqueous phase and then of dewatering the filtered materials on the surface of a rotary drum vacuum filter in order to produce a cake of solids of low moisture content. More particularly, the method of this invention is directed to the dewatering of sodium bicarbonate solids and of materials having the following properties like sodium bicarbonate when in a moist form: relatively high porosity, compressibility, the capability of being dewatered by steam and the tendency to crack. Among materials having such properties are copper concentrates and polymers such as ABS. Other objects of the present invention can be readily ascertained by reference to the following description and appended drawing, which are offered by way of example only and not in limitation of the invention, whose scope is defined by the appended claims and equivalents.

The drawing, labeled FIG. 1, is a schematic diagram of a rotary drum vacuum filter equipped to carry out the method of the present invention.

In FIG. 1, a rotary drum vacuum filter of conventional construction comprises a cylindrical drum member 13 supported for rotation about its central axis 14 in the direction indicated by the curved arrow. The drum is positioned for partial submergence in a liquid-holding tank 15 having an inlet conduit 17 through which slurry is introduced into the tank for filtering. As the drum rotates, successive sectors of its periphery move into and out of submergence in the slurry. Typically, between 12 and 60% of the drum surface is immersed; in the illustrated arrangement, the zone submergence A subtends a radial angle of about 100°.

The peripheral surface of the drum is covered by a porous filter medium, as is conventional. Also conventionally, a plurality of liquid-carrying conduits are supported within the drum in communication between sectors on the peripheral surface of the drum and a central rotary valve which is adjustable so that vacuum can be delivered, via the conduits, to selected sectors according to their position relative to the tank. Vacuum communicated to the sectors during submergence creates a pressure differential which draws liquid from the slurry through the filter medium; this filtrate liquid is then carried via the conduits within the drum, to discharge through the rotary valve. Solids from the slurry are retained on the medium to form the aforementioned filter cake. After a sector emerges from the slurry, the contained application of vacuum effects dewatering and drying of the filter cake by drawing air therethrough. In the illustrated embodiment, it is contemplated that vacuum is applied to sectors in the four zones designated B–E after the sectors rotate out of submergence.

In the illustrated embodiment, a spray manifold 19 is mounted to spray water onto the filter cake after it emerges from the slurry in the tank 15 to effectuate a washing of the filter cake. Before and during the water spray, air is drawn through the filter cake. The prewash air-drying zone is designated as zone B in FIG. 1 and subtends and angle of about 40°.

In a zone C following the washing zone, a roller 21 is mounted with its central axis parallel to that of the filter drum and is positioned to contact the filter cake on the drum surface. The roller extends the length of the drum and is rotatable about its central axis. The roller 21 is connected to a pressure applying means 23, such as a pneumatic or hydraulic piston-and-cylinder assembly, which forces the roller toward the drum surface to compress the filter cake. According to the present invention, the force on the roller ranges from 100 to 200 pounds per foot of drum length. The present invention also contemplates that the roller is driven to rotate so that the velocity of the surface of the roll exceeds the velocity of the surface of the filter drum by about 25 to 75%. The action of the roller tends to compress the filter cake and, at the same time, to push it ahead on the drum surface. The result is somewhat like troweling and has been found to produce a very smooth filter cake which has little or no tendency to crack or adhere to the roller. On the other hand, cracking and adherence did occur if the roller speed was generally equal, or synchronous, with the drum speed. In FIG. 1, the rolling zone is designated as zone C and subtends an angle of about 30°.

Following zone C is a zone D of about 100° defined by a conventional steam-containing hood 25 which extends the length of the filter drum and which has suitable steam inlets. As the drum rotates, the filter cake enters the hood 25 under a flexible flap member 27 and then exits the hood under a second flexible flap member 29, both of which depend from the hood and serve to isolate the steam environment. It is well known that steam will dry the aforementioned materials and, especially, filter cakes comprised of sodium bicarbonate. Steam drying is taught, for example, in U.S. Pat. No. 3,592,341 to R. C. Emmett and D. A. Dahlstrom.

With respect to the present invention, it has been found that the pressure exerted by the roller 21 determines, in part, the permeability of the filter cake to the steam and, further, that the permeability of the cake can be modified by changing the pressure of the roller to allow the desired amount of steam to pass through the filter cake. The quantity of steam passing through the cake can be determined, for example, by measuring the temperature of the filtrate leaving the drum.

Following the steaming zone, the filter cake passes through a zone E where air is drawn through the cake to accomplish further drying. In FIG. 1, zone E subtends an angle of about 40° to 45°. After that zone, the filter cake is removed from the drum surface by a conventional doctor blade 31 or the like. Before a sector of the filter drum reenters the slurry, it is preferable to wash the filter medium covering that sector with water sprayed from a manifold 33 and to blow air outwardly through the filter medium to clean its pores and prevent it from blinding.

We claim:

1. An improved process for dewatering a cake of solids that is formed on the filter medium of the drum of a rotary drum vacuum filter that is disposed for rotation in partial submergence in a slurry containing suspended solids, said process comprising the steps of:
   a. drawing air through the cake of solids on the surface of the filter drum after the drum is rotated out of submergence from the slurry in order to partially dry the filter cake;
   b. then, pressing the filter cake against the surface of the drum by means of a pressure-applying roll which is driven to rotate so that its surface velocity exceeds the velocity of the drum surface by 25 to 75%;
   c. thereafter, drawing steam through the filter cake while it is still on the surface of the filter drum; and
   d. then, discharging the steamed filter cake from the surface of the filter drum.

2. The process of claim 1 wherein the roll is pressed against the drum surface with a force ranging from 100 to 200 pounds per foot of width of the drum.

3. The process of claim 2 wherein the slurry consists of sodium bicarbonate solids in suspension in a liquid phase.

* * * * *